(12) United States Patent
Litch et al.

(10) Patent No.: US 9,251,107 B2
(45) Date of Patent: Feb. 2, 2016

(54) IMMEDIATE DIRECT MEMORY ACCESS DESCRIPTOR-BASED WRITE OPERATION

(71) Applicant: SILICON LABORATORIES INC., Austin, TX (US)

(72) Inventors: Timothy E. Litch, Dripping Springs, TX (US); Paul Zucker, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 13/928,506

(22) Filed: Jun. 27, 2013

(65) Prior Publication Data

US 2015/0006768 A1    Jan. 1, 2015

(51) Int. Cl.
*G06F 13/28* (2006.01)
(52) U.S. Cl.
CPC .................................... *G06F 13/28* (2013.01)

(58) Field of Classification Search
None
See application file for complete search history.

(56) References Cited

U.S. PATENT DOCUMENTS 6,647,438 B1 * 11/2003 Connor et al. .................. 710/22
8,443,118 B2 * 5/2013 Go et al. ......................... 710/22
2007/0073923 A1 * 3/2007 Vemula et al. ................. 710/22
2011/0314186 A1 * 12/2011 Go et al. ......................... 710/26

OTHER PUBLICATIONS

U.S. Appl. No. 13/928,487, entitled, "Direct Memory Access Descriptor-Based Synchronization," filed Jun. 27, 2013, 21 pages.

* cited by examiner

*Primary Examiner* — Elias Mamo
(74) *Attorney, Agent, or Firm* — Trop, Pruner & Hu, P.C.

(57) ABSTRACT

A method includes processing a direct memory access (DMA) descriptor in a DMA controller. The method includes storing first data of the DMA descriptor at an address that is identified by second data of the DMA descriptor.

17 Claims, 4 Drawing Sheets

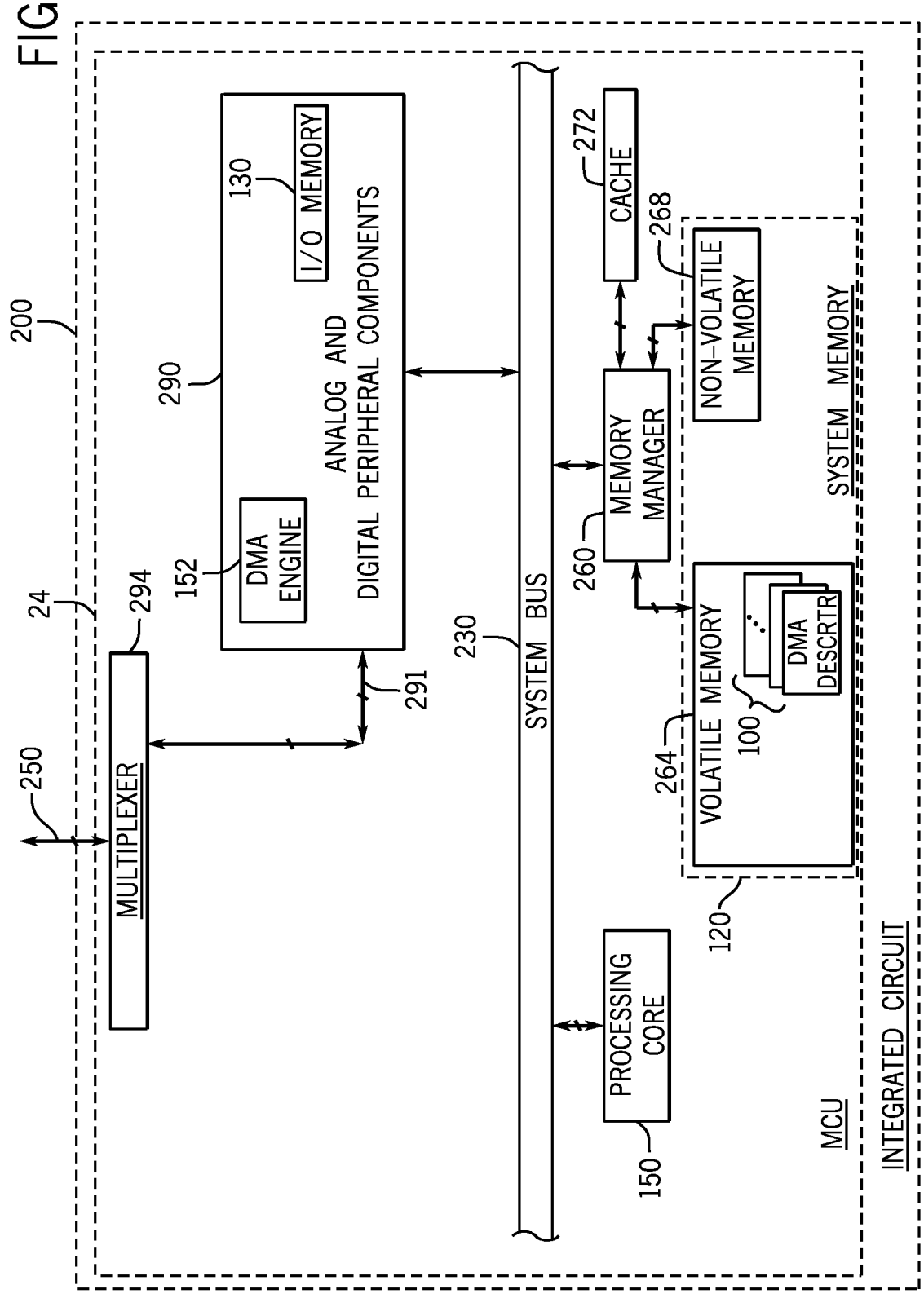

US 9,251,107 B2

IMMEDIATE DIRECT MEMORY ACCESS DESCRIPTOR-BASED WRITE OPERATION

CROSS REFERENCE TO RELATED APPLICATIONS

This application is related to U.S. patent application Ser. No. 13/928,487, entitled, "DIRECT MEMORY ACCESS DESCRIPTOR-BASED SYNCHRONIZATION," which was filed on Jun. 27, 2013.

BACKGROUND

One way to communicate data between a system memory and a peripheral component of a computer system is for a central processing unit (CPU) to serve as an intermediary for the communication. For example, to transfer data from the system memory to the peripheral component, the CPU may perform the transfer by initiating the appropriate read operations to retrieve the data from the system memory and initiating the appropriate write operations to store the retrieved data in the memory of the peripheral component. For purposes of reducing CPU overhead, the computer system may employ direct memory access (DMA) in which a DMA engine of the peripheral component directly accesses the system memory to transfer the data. The CPU typically programs the DMA engine to set up the parameters for the transfer, such as the source and destination addresses and the number of bytes to transfer.

SUMMARY

In an example embodiment, a method includes processing a direct memory access (DMA) descriptor in a DMA controller. The method includes storing first data of the DMA descriptor at an address that is identified by second data of the DMA descriptor.

In another example embodiment, an apparatus includes a system memory, an input/output (I/O) memory and a DMA engine. The DMA engine processes descriptors to control at least one DMA channel. The DMA engine is adapted to identify whether a first descriptor of the descriptors is associated with an immediate write structure and in response to the identification, store first data of the first descriptor at a location of the I/O memory, which is identified by second data of the first descriptor.

In yet another example embodiment, an apparatus includes an integrated circuit, which includes a DMA controller, and a memory. The DMA controller is adapted to process a DMA descriptor to store first data of the DMA descriptor at an address of the memory, which is identified by second data of the descriptor.

Advantages and other desired features will become apparent from the following drawings, description and claims.

BRIEF DESCRIPTION OF THE DRAWINGS

FIG. 2 is a schematic diagram of an MCU of the system of FIG. 1 according to an example embodiment.

DETAILED DESCRIPTION

Figure 1:
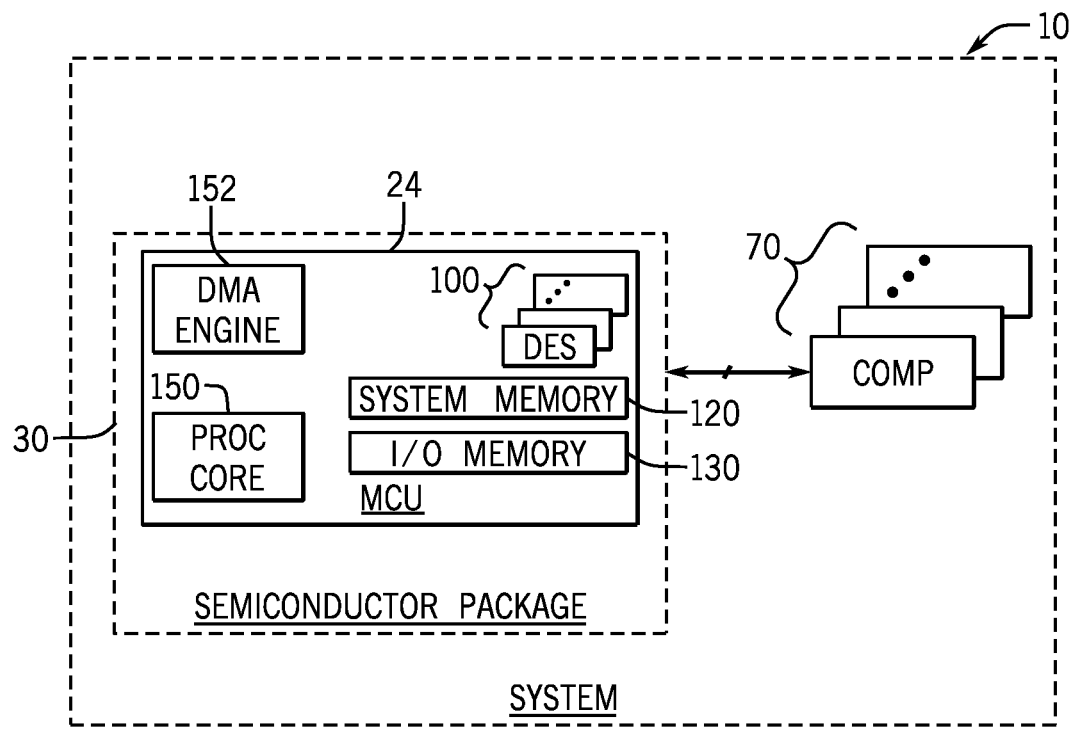
FIGS. 1 and 6 are schematic diagrams of microcontroller unit (MCU)-based systems according to example embodiments.

One way to set up a given direct memory access (DMA) transfer (also referred to herein as a "DMA cycle") is for a processing core (a central processing unit (CPU), for example) to program registers of a peripheral component's DMA controller, or engine, with the parameters for the transfer, such as the source and target address, the size of the data being transferred and the strides associated with the transfer. Another way to set up a DMA transfer is for the CPU to store the parameters in a memory data structure called a "DMA descriptor."

A DMA descriptor, in general, is a data structure that is processed, or executed, by a DMA engine for purposes of programming parameters into the DMA engine for an associated DMA transfer. A given DMA descriptor may further direct, or link, the DMA engine to the next DMA descriptor to be processed by the DMA engine so that a set of DMA descriptors may be linked together in a linked list to form a particular DMA descriptor execution flow, or path. A particular advantage of DMA descriptors, as compared to register programming, is that multiple, linked DMA descriptors may be set up in memory to program a corresponding sequence of DMA transfers.

Techniques and systems are disclosed herein for purposes of using a DMA descriptor to cause a DMA controller, or engine, to perform an "immediate write": a write of data contained in the DMA descriptor to an address that is indicated by the DMA descriptor. In other words, due to the execution of the DMA descriptor, a single operation may be generated on a system bus, indicating both an address and data, which are specified by the DMA descriptor. This may be particular advantageous for such purposes of storing data in input/output (I/O) memory, such as storing data in a register of a peripheral, for example, as processing core intervention is not used.

In this manner, when executing a linked list of descriptors, a DMA engine may occasionally reprogram on-chip memory-mapped hardware resources at various times within the descriptor chain. This in effect off-loads the application management of hardware, which is otherwise performed by the processing core. The memory address space of these registers typically is referred to as the "I/O memory space," which is a memory space that is separate from the main memory space of the system. One way for a DMA controller to update these hardware resources is for the DMA controller to save updated register values to the system memory and then initiate a DMA transfer to transfer the values stored in system memory to the registers. In accordance with example embodiments disclosed herein, the DMA controller directly, or immediately, perform a write operation to update an I/O memory location in a single DMA transfer.

In this manner, a given DMA descriptor may have an "immediate write structure." Upon recognizing that a given DMA structure contains such an immediate write structure, the DMA engine interprets the DMA descriptor in such a manner that allows the DMA engine to extract a value (a register value, for example) that is contained in the DMA descriptor and store the value in a memory address (an I/O memory address of the register, for example), which the DMA engine also extracts from the DMA descriptor.

Among the potential advantages of the DMA descriptor-based immediate write operation disclosed herein are that data space may be conserved by incorporating the data value into the DMA descriptor; a read bus cycle is not used to retrieve the data value prior to the write operation; and overhead is transferred from the processing core to the DMA engine. Other and different advantages may be apparent to the person of ordinary skill in the art.

As a more specific example, FIG. 1 depicts an MCU 24 in an example system 10. For this example, the MCU 24 controls various aspects of one or multiple components 70 in response to communications with the component(s) 70. As examples, the components 70 may include one of more of the following depending on the particular application: an electrical motor, a household appliance, an inventory control terminal, a computer, a tablet, a smart power meter, a wireless interface, a cellular interface, an interactive touch screen user interface, a flow sensor, and so forth. All or part of the components of the MCU 24 may be part of a semiconductor package 30.

As depicted in FIG. 1, the MCU 24, in accordance with example embodiments, includes a hardware-based DMA engine 152, which may be part of a peripheral component (a network interface, a wireless interface, a general purpose input/output (GPIO) interface, and so forth) of the MCU 24. The DMA engine 152 executes DMA descriptors for purposes of setting up and initiating corresponding DMA transfers within the MCU 24. A given DMA transfer may be, as examples, a transfer from a memory of the peripheral component containing the DMA engine 152 to a system memory of the MCU 24; a transfer from the system memory to the memory of the peripheral component; an immediate write operation between system memory locations; a peripheral-to-peripheral transfer; or a transfer to directly store data contained in a DMA descriptor in I/O memory.

In accordance with example embodiments, the MCU 24 includes a system memory 120 and an I/O memory 130. The system memory 120 is associated with the main memory for the MCU 24 and may store, as examples, the DMA descriptors, packet data, program variables, data structures, images, and so forth. The I/O memory 130, in general, refers to the memory space (register addresses) of the peripherals of the MCU 24, such as the registers of the DMA engine, universal asynchronous receiver/transmitter (UART), serial peripheral interface (SPI), programmable timers, and so forth.

Referring to FIG. 2, in accordance with some embodiments, all or part of the components of the MCU 24 may be part of an integrated circuit (IC) 200. As examples, all or part of the components of the MCU 24 may be fabricated on a single die or on multiple dies. The integrated circuit 200 may be packaged to form the semiconductor package 30 (see FIG. 1).

Among its components, the MCU 24 includes the processing core 150 and an exemplary peripheral component 140 that contains the DMA engine 152. Depending on the particular embodiment, the MCU 24 may not contain any of the components depicted in FIG. 2 other than the processing core 150 and the DMA engine 152; may contain one or more of the components that are depicted in FIG. 2 in addition to the processing core 150 and the DMA engine 152; may contain other and/or additional components than the components that are depicted in FIG. 2; and so forth. Thus, many embodiments are contemplated, which are within the scope of the appended claims.

As an example, the processing core 150 may be a 32-bit core, such as the Advanced RISC Machine (ARM) processing core, which executes a Reduced Instruction Set Computer (RISC) instruction set. In general, the processing core 150 communicates with various other system components of the MCU 24, such as a memory controller, or manager 260, over a system bus 230. In general, the memory manager 260 controls access to various memory components of the MCU 24, such as a cache 272, a non-volatile memory 268 (a Flash memory, for example) and a volatile memory 264 (a static random access memory (SRAM), for example). As depicted in FIG. 2, the volatile memory 264 and the non-volatile memory 268 may form the system memory 120 of the MCU 24. In other words, the volatile memory 264 and the non-volatile memory 268 have memory locations that are part of the system memory address space for the MCU 24.

It is noted that FIG. 2 depicts a block diagram representation of the MCU architecture, as the MCU 24 may have many other components, bridges, buses, and so forth, in accordance with other exemplary embodiments. For example, in accordance with some embodiments, the MCU 24 may have a bus matrix module that implements slave side arbitration and is used to regulate access to the memory devices of the MCU 24.

In accordance with some embodiments, the MCU 24 includes analog and digital components 290, which communicate analog and digital signals with I/O terminals 291. The analog components may include various components that receive analog signals, such as analog-to-digital converters (ADCs) and comparators; and the MCU 24 may contain analog components that provide analog signals, such as current drivers.

The digital components of the MCU 24 may communicate with the processing core 150 over the system bus 230. As examples, the digital components may include a Universal Serial Bus (USB) interface, a UART interface, a system management bus interface (SMB) interface, an SPI interface, and so forth. In general, these digital components communicate with devices that are external to the MCU 24 via I/O terminals 291. In accordance with example embodiments, the MCU 24 includes a multiplexer 294 for purposes of programmably assigning terminals of the analog and digital components 290 to the I/O terminals 250 of the MCU 24. In accordance with example embodiments, the digital components may contain various peripheral components that have registers that are mapped to the I/O memory space of the MCU 24, and as such, are represented in FIG. 2 as belonging to the I/O memory 130.

As depicted in FIG. 2, in accordance with some embodiments, the pending DMA descriptors 100 may be stored in the volatile memory 264. In accordance with example embodiments, the DMA engine 152 may transfer one or more of these pending DMA descriptors 100 into a memory of the engine 152 for execution. It is noted that the DMA engine 252 may retrieve the DMA descriptors 100 from the volatile memory 264, although the processing core 150 may retrieve the DMA descriptors 250 from the volatile memory 264 and store the DMA descriptors 100 in the DMA engine's memory, in accordance with further embodiments. In accordance with further embodiments, the pending DMA descriptors 100 may be stored in non-volatile memory, such as the non-volatile memory 268, for example.

Figure 3:
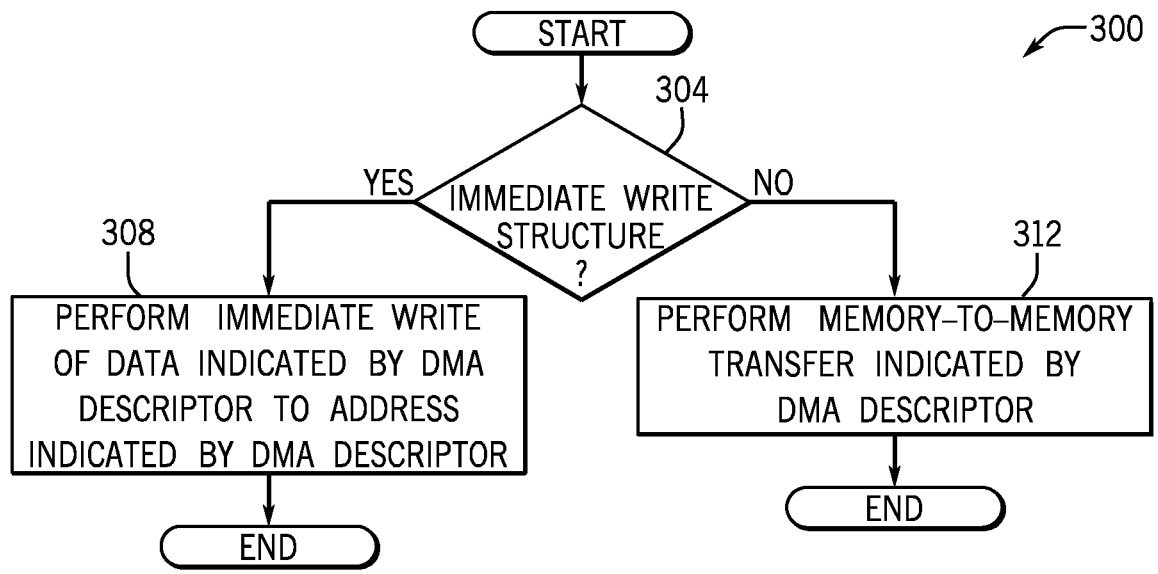
FIG. 3 is a flow diagram depicting a technique to perform an immediate direct memory access (DMA) descriptor-based write operation according to an example embodiment.

In accordance with an example implementation, the DMA engine 152 performs a technique 300 that is depicted in FIG. 3 for purposes of directly, or immediately, writing data contained in a DMA descriptor to the I/O memory 130 for such purposes as, for example, updating a register of a peripheral. Referring to FIG. 3 in conjunction with FIG. 2, pursuant to the technique 300, the DMA engine 152 determines (decision block 304) whether the DMA descriptor defines an immediate write structure. If so, the DMA engine 152 performs (block 308) an I/O memory write of data indicated by the DMA descriptor to a memory address, which is also indicated by the DMA descriptor. Otherwise, the DMA engine 152 performs (block 312) an operation indicated by the DMA descriptor (a system memory-to-system memory transfer operation, for example).

In accordance with an example embodiment, the DMA descriptor may contain the same fields, regardless of whether the descriptor is used for an immediate write or for another type of DMA transfer. In this manner, the DMA engine 152 is constructed to interpret the fields differently, depending on the type of structure that is contained in the DMA descriptor. As a more specific example, FIG. 4 depicts a DMA descriptor 400 according to an example embodiment.

Figure 4:
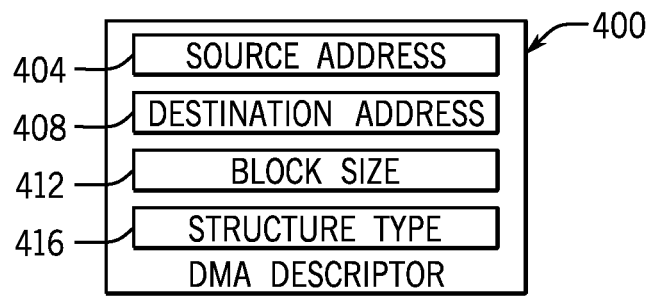
FIG. 4 is an illustration of a DMA descriptor according to an example embodiment.

Referring to FIG. 4, the DMA descriptor 400 includes a source address field 404. For a normal DMA transfer structure, the source address 404 contains the starting address of the source data to be transferred for a given DMA cycle. This field may be incremented by the DMA engine 152 after each unit of data is read into an internal first in first out (FIFO) of the engine. After the DMA cycle has completed, the source address points to the next address following the last unit of which the data was read. When the DMA descriptor 400 contains an immediate write structure, however, the DMA engine 152 interprets the source address field 404 differently. In this regard, for an immediate write structure, the DMA engine 152 interprets the source address field 404 to contain the data to be written to memory in an immediate write operation. It is noted that for the immediate write operation, a source address may be omitted, as the data to be written originates with the DMA descriptor 400; and as such may be programmed into descriptor 400 (assuming that the data to be written are known at the time the DMA descriptor 400 is written).

The DMA descriptor 400, for this example, further includes a destination address field 408. For a normal DMA transfer structure, the DMA engine 152 interprets the data contained in the destination address field 408 as the address location of system memory. For the immediate I/O write structure, however, the DMA engine 152 interprets the destination address 408 as identifying the address for the immediate write operation.

The DMA descriptor 400 may further include a block size field 412, which, in general, contains data that identifies the number of unit data transfers per arbitration cycle, thereby providing a way to balance the DMA channel's load based on the latency of the requestors. In accordance with an example embodiment, the block size field 412 may further contain data that designates whether the DMA descriptor 400 is an immediate write structure or another structure. Moreover, data additionally contained in a structure type field 416 of the DMA descriptor 400 may be used independently or in conjunction with the structure identifying data of the block size field 412 for purposes of identifying the structure type for the DMA descriptor 400. Thus, many variations are contemplated, which are within the scope of the appended claims.

Among many potential applications of the DMA descriptor-based immediate write, the DMA descriptor may be used for purposes of creating "self-modifying code" to reprogram the DMA engine 152. As examples, a DMA descriptor may be used to change an arbitration mode of the DMA engine 152 or change the requestor for a given DMA channel. Thus, for the latter example, a given linked list of DMA descriptors may, without processor core intervention, change DMA requesters for an associated DMA channel.

Figure 5:
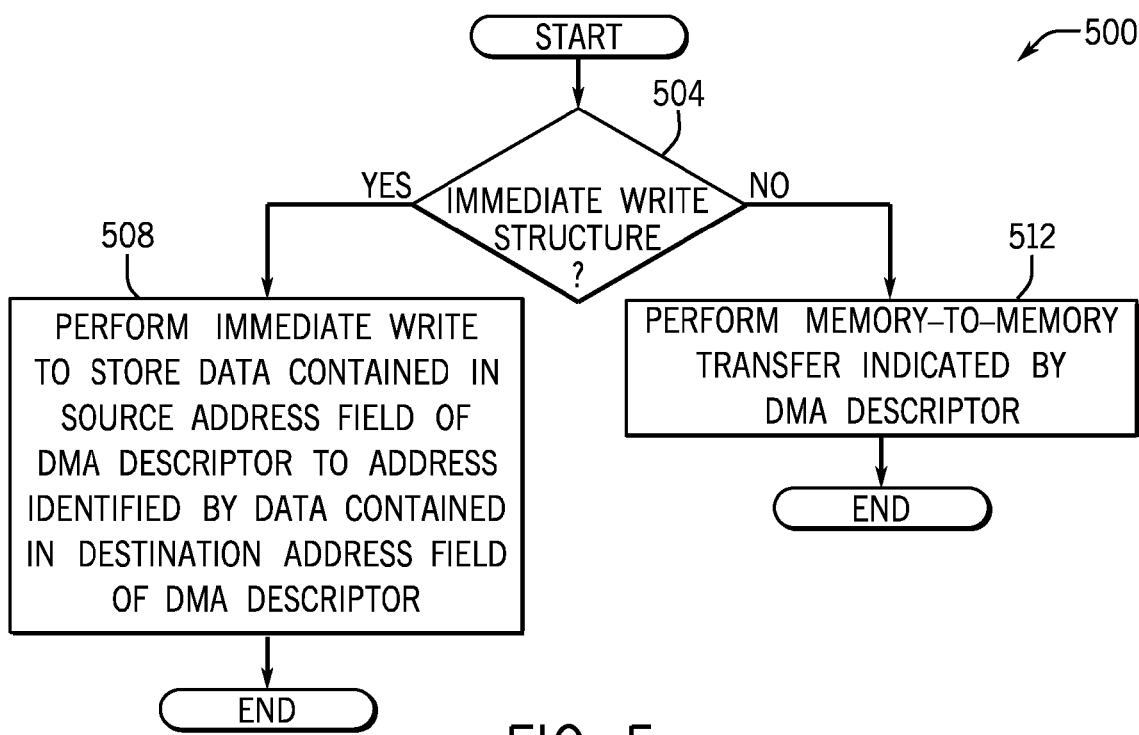
FIG. 5 is a flow diagram depicting a technique to perform an immediate DMA descriptor-based write operation according to an example embodiment.

Referring to FIG. 5, in accordance with an example embodiment, the DMA engine 152 may perform a technique 500 to process a given DMA descriptor. Pursuant to the technique 500, the DMA engine 152 determines (decision block 504) whether the current DMA descriptor contains an immediate memory write structure. If so, the DMA engine 152 performs (block 508) a write operation to store data contained in the source address field of the DMA descriptor to an address identifying the data contained in a destination address field of the DMA descriptor. Otherwise, if the DMA engine determines (decision block 504) that the DMA descriptor does not contain an immediate write structure, then the DMA engine performs (block 512) an operation indicated by the DMA descriptor (a memory-to-memory transfer, for example).

Figure 6:
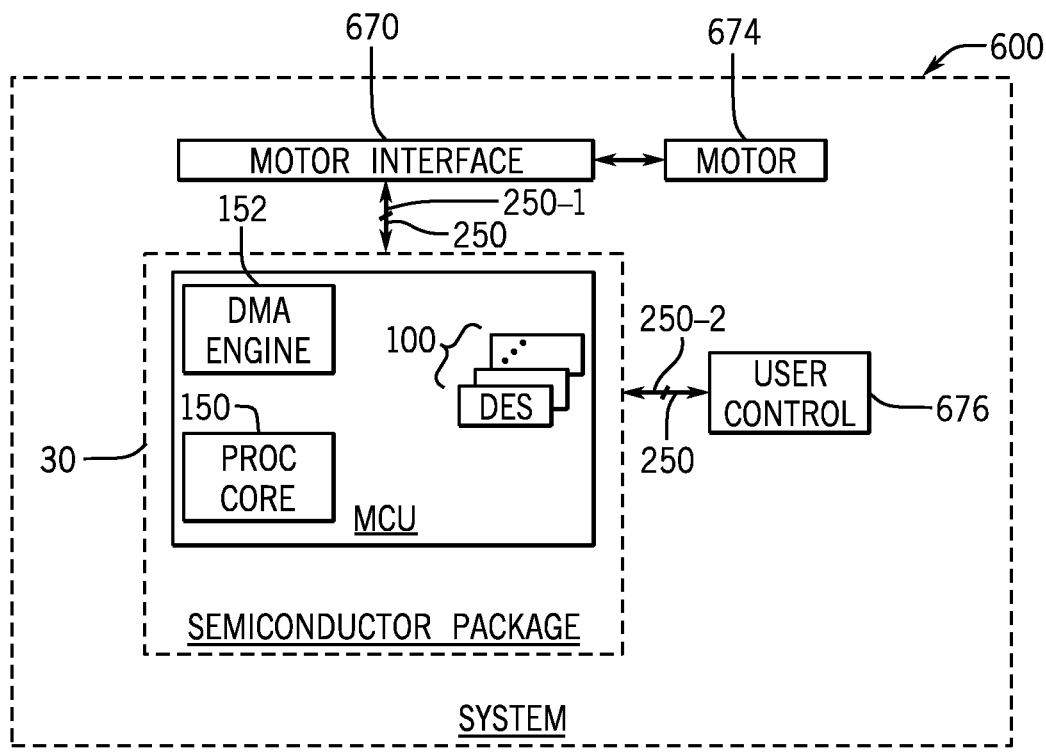

Referring to FIG. 6, in accordance with some embodiments, the MCU 24 may be part of a system 600 to control a motor 674. In this manner, the MCU 24 may generate/receive input and output signals (I/O signals) in connection with the control of a motor interface 670 that generates and receives signals in connection with operating the motor 674. For example, the MCU 24 may generate signals at its I/O terminals 250-1 for purposes of communicating with drivers, sensors, and so forth of the motor interface 670; and in connection with this communication; and the I/O terminals 250-1 may communicate waveforms (pulse width modulation (PWM) signals, for example), receive sensed currents and voltages, communicate data via one or more serial buses, and so forth. Other I/O terminals 250-2 of the MCU 24 may generate/receive signals to communicate with a user control interface 676 for such purposes as communicating status of the motor 674 and motor interface 670; communicating detected fault conditions; receiving user-directed commands and signals; and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
processing a direct memory access (DMA) descriptor in a DMA controller, the DMA descriptor including first data and second data;
storing the first data at an address identified by the second data,
wherein processing the DMA descriptor comprises:
determining, based on third data of the DMA descriptor, to identify the DMA descriptor as being associated with a first descriptor type; and
in response to the determination, reading the first data from a field of the DMA descriptor, the field being associated with a memory address and being associated with a second descriptor type.

2. The method of claim 1, wherein processing the DMA descriptor comprises generating a write operation on a bus to communicate the first data and the address identified by the second data.

3. The method of claim 1, wherein processing the DMA descriptor comprises performing a single write operation on a bus to store the second data in an input/output (I/O) location identified by the address.

4. The method of claim 1, wherein processing the DMA descriptor comprises storing the first data in a memory of a peripheral device.

5. The method of claim 4, wherein the peripheral device comprises the DMA controller or a device other than the DMA controller.

6. An apparatus comprising:
a system memory;
an input/output (I/O) memory; and a direct memory access (DMA) engine to process descriptors to control at least one DMA channel, the DMA engine being adapted to:
   identify whether a first descriptor of the descriptors is associated with a first descriptor type associated with an immediate write structure;
   in response to the identification, store first data of the first descriptor at a location of the I/O memory which is identified by second data of the first descriptor; and
   in response to identifying that the first descriptor is associated with the immediate write operation, read first data from a field of the first descriptor associated with an address of the system memory for a descriptor associated with a second descriptor type.

7. The system of claim 6, wherein the descriptors form at least part of a linked descriptor list.

8. The system of claim 6, wherein the I/O memory comprises a peripheral-based memory.

9. The system of claim 6, wherein the DMA engine is further adapted to:
   identify whether another descriptor of the descriptors is associated with a data transfer between system memory locations; and
   in response to the identification of the another descriptor being associated with the data transfer between the system memory locations, generating a bus operation to perform the data transfer.

10. The system of claim 6, wherein the DMA engine is further adapted to retrieve at least one of the descriptors from the system memory.

11. The system of claim 6, wherein the system memory is associated with a first address space, and the I/O memory is associated with a second memory space separate from the first address space.

12. An apparatus comprising:
an integrated circuit comprising a direct memory access (DMA) controller, and a memory,
wherein the DMA controller is adapted to:
   process a DMA descriptor to store first data of the DMA descriptor at an address of the memory identified by second data of the descriptor;
   determine, based on third data of the DMA descriptor, to identify the DMA descriptor as being associated with a first descriptor type; and
   in response to the determination, read the first data from a field of the DMA descriptor, the field being associated with a memory address and being associated with a second descriptor type.

13. The apparatus of claim 12, wherein the DMA controller is adapted to generate a write operation on a bus, the write operation being associated with the first data and the address of the memory identified by second data of the descriptor.

14. The apparatus of claim 12, wherein the DMA controller is adapted to perform a single write operation on a bus to store the second data in a I/O memory location identified by the address of the memory identified by second data of the descriptor.

15. The apparatus of claim 12, wherein the DMA controller is adapted to store the first data in I/O memory.

16. The apparatus of claim 12, wherein the DMA controller is adapted to process a linked group of DMA descriptors comprising the DMA descriptor processed to store the first data.

17. The apparatus of claim 12, wherein the memory comprises a memory of a peripheral device.

* * * * *